United States Patent [19]

King

[11] Patent Number: 5,036,710
[45] Date of Patent: Aug. 6, 1991

[54] MULTI-PHASE FLOWMETER

[75] Inventor: Nicholas W. King, Glasgow, Scotland

[73] Assignee: The Secretary of State for Trade and Industry in Her Britannic Majesty's Government of the United Kingdom of Great Britian and Northern Ireland, London, England

[21] Appl. No.: 543,889

[22] Filed: Apr. 24, 1990

Related U.S. Application Data

[63] Continuation of PCT GB88/00683 Aug. 19, 1989.

[30] Foreign Application Priority Data

Aug. 24, 1987 [GB] United Kingdom ............... 8719972

[51] Int. Cl.$^5$ .......................... G01F 1/74; G01F 15/08
[52] U.S. Cl. ................................. 73/861.04; 73/200; 55/203; 55/274
[58] Field of Search ................. 73/200, 861.04; 55/18, 55/203, 204, 274, 456

[56] References Cited

U.S. PATENT DOCUMENTS

| 2,831,350 | 4/1958 | Banks et al. ...................... 73/200 |
| 2,993,480 | 7/1961 | Huet ................................... 55/456 X |
| 4,178,801 | 12/1979 | Cassell et al. ..................... 73/200 X |
| 4,666,476 | 5/1987 | Reeve et al. ......................... 55/203 |
| 4,760,742 | 8/1988 | Hatton ............................... 73/200 X |
| 4,817,439 | 4/1989 | Arnaudeau et al. ............. 73/861.04 |

Primary Examiner—Herbert Goldstein
Attorney, Agent, or Firm—Nixon & Vanderhye

[57] ABSTRACT

A flow meter for measuring liquid and gaseous flow rates in a mixed fluid flow has one or more helical fins (17) positioned between a cylindrical sleeve (10) and a core member (11). Centrifugal effects resulting from fluid flow though channels (29) defined between fins (17) sleeve (10) and core (11) separate liquid and gaseous phases, and the gaseous phase passes through bores (28) in the core member (11) to a central cavity (19) substantially closed at an upstream end (12). Liquid flow rate is measured in a channel (16) between the sleeve (10) and core member (11) after removal therefrom of gas, and gaseous flow is measured at an open downstream end (14) of the cavity (19). Flow rates may be measured using, for example, venturis (16,32,33,27,30,31). After measurement of the flow rates the liquid and gaseous phases are allowed to remix.

9 Claims, 1 Drawing Sheet

Fig.1.
Fig.2.
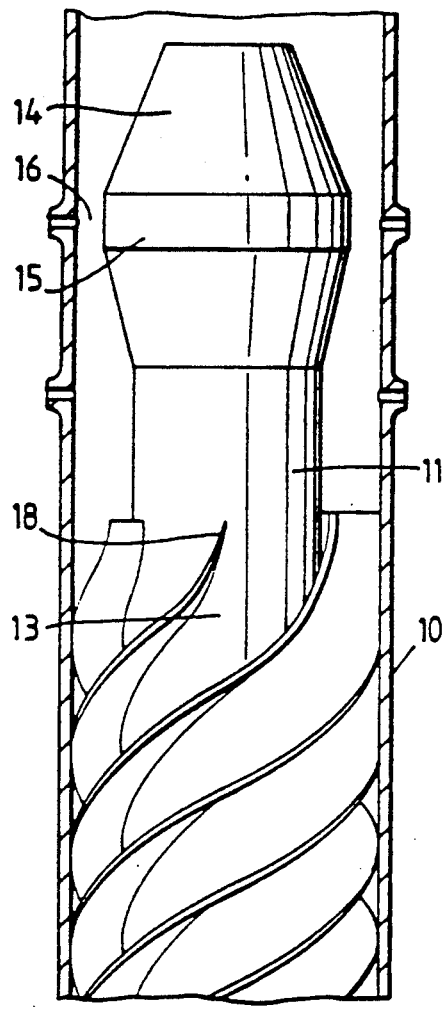
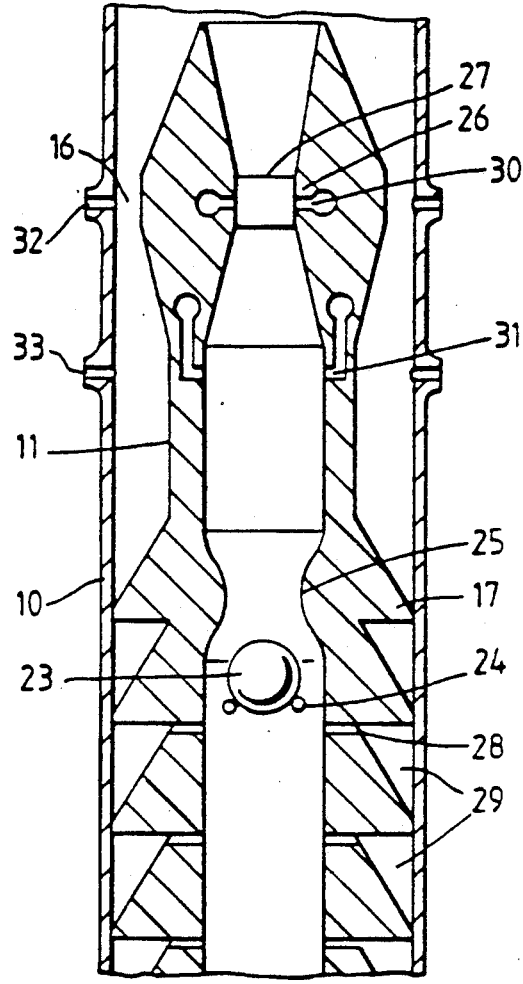
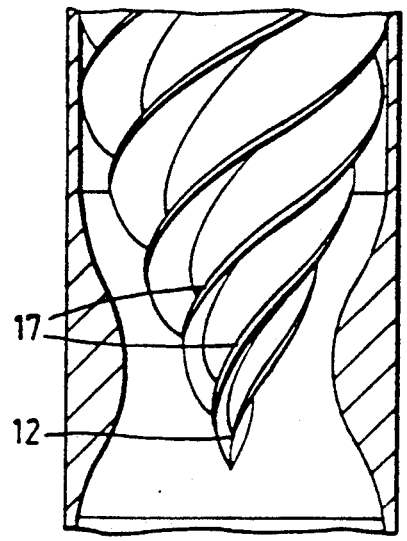
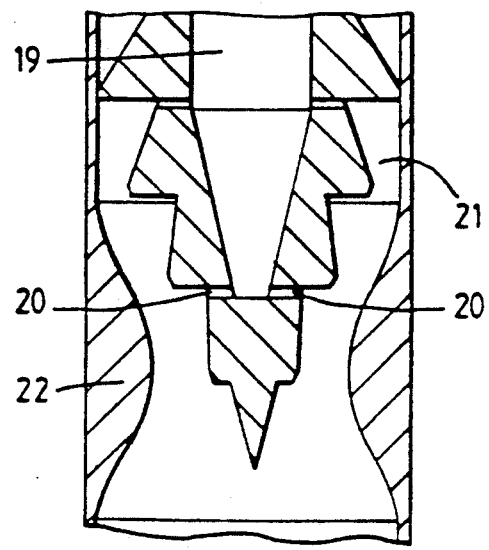

MULTI-PHASE FLOWMETER

This application is a continuing application under 35 USC 363 of International Application No. PCT/GB88/00683, filed Aug. 19, 1988.

BACKGROUND OF THE INVENTION

1. Field of the Invention

The present invention is concerned with flowmeters for measuring liquid and gaseous flow rates in a mixed fluid flow.

2. Discussion of Prior Art

One example of the type of mixed fluid flow with which the invention is concerned is the mixture of oil and a gas obtained from natural deposits. It is desirable to know the composition of the supply from an oilfield for various reasons such as the planning of storage and processing, and also for fiscal reasons. However measuring the proportions of liquid and gas in a fluid flow of this type is not easy, as the composition tends to vary randomly. The simple method of analysing samples can therefore give misleading figures.

SUMMARY OF THE INVENTION

According to the present invention a flowmeter for measuring liquid and gaseous flow rates in a mixed fluid flow includes a cylindrical sleeve having co-axially aligned therein and extending part way therealong a core from which extends outwardly at least one helical fin, characterised in having a plurality of bores extending inwardly through the core from a channel defined between the sleeve, the core and the or each helical fin to a central cavity which is substantially closed at an upstream end and open at a downstream end and in having at the downstream end flow measurement devices in a passage between the sleeve and core and in the central cavity.

The flow measurement devices are most conveniently of the pressure differential type such as venturis or orifice plates, but may alternatively be, for example, turbine meters or acoustic cross-correlation devices.

Similar flow measurement devices may be used in the passage and in the cavity, but it may in some cases be advantageous to use different devices.

A preferred form of flow meter is adapted to be used vertically with fluid flow upwards therethrough, and preferably has a core which expands outwardly from an upstream tip to a substantially cylindrical section. The core preferably has venturi suction ports extending from the upstream end of the cavity to an expanding portion of the outside of the core, and the cavity preferably contains a liquid check valve, preferably of the float type.

The helical fin or fins preferably have helicality reduced to straighten flow upstream of the pressure differential measuring device in the annular channel. The fin or fins preferably extend to contact the cylindrical sleeve.

The invention also includes a method of separately measuring the liquid and gaseous flows in a mixed fluid flow involving passing the flow through a helical passage defined in an annular channel between a core and a sleeve, allowing gas to pass through bores in the core to a central cavity and measuring the flow therein, and measuring the flow of liquid remaining in the annular channel.

BRIEF DESCRIPTION OF THE INVENTION

One embodiment of the invention will now be described, by way of example only, with reference to the accompanying diagrammatic drawings, of which:

FIG. 1 is an elevation, partly in section, of a flowmeter according to the invention, and FIG. 2 is an elevation in full section corresponding to FIG. 1.

DETAILED DESCRIPTION OF PREFERRED EMBODIMENTS

A flowmeter has a cylindrical sleeve 10 (shown in section in FIGS. 1 and 2) and a core 11 (shown in Section in FIG. 2). The core 11 has an upstream end 12 in the form of a tip and expands to a mid portion 13 of substantially constant diameter. Towards a downstream end 14 the core has an outward expansion 15 to define with the sleeve 10 a first passage 16 forming a first venturi. A plurality of fins such as those shown at 17 extend helically from the tip 12, along the central portion 13 of the core, to straighten out as illustrated at 18, and to terminate before the start of the outward expansion 15.

Within the core 11 is a cavity 19 (FIG. 2) which is substantially closed at the upstream end 12 apart from ports 20 which lead into an annular passage 21 defined between the sleeve 10 and core 11 adjacent a local constriction 22 in the bore of the sleeve 10. Contained in the cavity 19 is a liquid check valve 23 movable between a support 24 and constriction 25. The cavity 19 has a constriction 26 defining a second venturi 27 adjacent the downstream end 14.

A plurality of bores such as those shown at 28 connect the innermost parts of channels 29, formed between the helical fins 17, and inside of the sleeve 10 and the core 11, along the mid portion 13 of the core 11, to the cavity 19. Pressure tappings 30, 31 are respectively positioned at, and upstream of the second venturi 27, and pressure tappings 32, 33 are respectively positioned at, and upstream of the first venturi 16.

In use the flow meter is positioned vertically with the upstream end 12 of the core 11 at the bottom. A mixed fluid flow is passed through the pipe defined by sleeve 10 and as is passes through the channels 29 defined by the helical fins 17 and sleeve 10 the helical motion and consequent centrifugal effect results in separation of the liquid and gaseous phases of the flow with the liquid phase outermost. The gas phase passes through the bores 28 into the cavity 29. Gaseous and liquid flow measurements are made using the pressure tappings 30, 31 and 32, 33 respectively, and the gas and liquid phases are allowed to remix after passing the downstream end 14 of upstream end 12 and be drawn back into the fluid flow through the ports 20 as a result of the venturi effect caused by the constriction 22. Should too much liquid enter the cavity 19 the liquid check valve will be moved from the stop 24 to block the constriction 25 preventing liquid from reaching the gaseous flow pressure measurement points 30, 31.

It will be realised that the pressures from pressure tappings 30, 31 will have to be conducted to outside the sleeve 10. Means for doing this will be readily apparent to those skilled in the art but may include, for example, narrow bore pipes crossing the annular channel 29, preferably downstream of the venturi 16, 27, or may even make use of bores extending through the core 11 and across intersections of fins 17 and sleeve 10.

The pressure measurements taken using pressure tappings 30, 31, 32 and 33 may be processed, using well known methods such as, for example, the use of computers, to give any required record of liquid and gaseous flow.

It will be realised that while flow measurements have been described as using venturis 16, 27 other pressure differential devices such as orifice plates may be used. Alternatively, more complicated meters such as, for example, turbine meters or acoustic cross-correlation meters may be used. Whilst the invention has been described as using the same type of measurement device, namely venturis 16, 27 to measure both liquid and gaseous flows it might in some cases be preferable to use a different measurement device for each phase. In some embodiments of the invention it might be preferable to process the differential pressure locally within the flowmeter and to pass signals in, for example, electrical form to outside the sleeve 10.

What is claimed is:

1. A flowmeter for measuring liquid and gaseous flow rates in a mixed fluid flow, including a cylindrical sleeve having co-axially aligned therein and extending part way therealong a core from which extends outwardly at least one helical fin, a plurality of bores extending inwardly through the core from a channel defined between the sleeve, the core and said at least one helical fin to a central cavity which is substantially closed at an upstream end and open at a downstream end and in having at the downstream end flow measurement devices in a passage between the sleeve and core and in the central cavity said cavity including at least one port extending from adjacent its upstream end to a venturi positioned in an annular passage between the core and the sleeve.

2. A flowmeter as claimed in claim 1 characterised in that the flow measurement devices are pressure differential devices.

3. A flowmeter as claimed in claim 1 characterised in that the flow measurement devices are venturis.

4. A flowmeter as claimed in claim 1 characterised in that the flow measurement devices are orifice plates.

5. A flowmeter as claimed in claim 1 characterised in that the measurement devices are of the same type.

6. A flowmeter as claimed in claim 1 characterised in that the cavity contains a liquid check valve.

7. A flowmeter as claimed in claim 1 characterised in that the check valve is of the float type.

8. A flowmeter as claimed in claim 1 characterised in that the helical fin or fins have helically reduced to straighten flow upstream of the flow measurement device in the passage.

9. A flowmeter as claimed in claim 1 characterised in having pressure access means to the cavity and to the passage.

* * * * *